(12) United States Patent
Soderbloom et al.

(10) Patent No.: US 9,257,145 B1
(45) Date of Patent: Feb. 9, 2016

(54) DISK DRIVE MEASURING DOWN-TRACK SPACING OF READ SENSORS

(71) Applicant: Western Digital Technologies, Inc., Irvine, CA (US)

(72) Inventors: Paul E. Soderbloom, Golden, CO (US); Davide Giovenzana, Longmont, CO (US); Michael W. Sheperek, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 98 days.

(21) Appl. No.: 14/264,244

(22) Filed: Apr. 29, 2014

Related U.S. Application Data

(60) Provisional application No. 61/909,913, filed on Nov. 27, 2013.

(51) Int. Cl.
*G11B 5/09* (2006.01)
*G11B 20/14* (2006.01)

(52) U.S. Cl.
CPC .................................. *G11B 20/14* (2013.01)

(58) Field of Classification Search
CPC ............ G11B 5/012; G11B 20/10009; G11B 5/59694; G11B 5/02; G11B 5/59688; G11B 5/59655; G11B 5/56; G11B 20/10; G11B 5/743
USPC ........ 360/39, 77.13, 64, 69, 75, 77.08, 77.11, 360/70
See application file for complete search history.

(56) References Cited

U.S. PATENT DOCUMENTS

| | | | |
|---|---|---|---|
| 4,012,781 | A | 3/1977 | Lin |
| 5,270,892 | A | 12/1993 | Naberhuis |
| 5,309,305 | A | 5/1994 | Nepela et al. |
| 5,388,014 | A | 2/1995 | Brug et al. |
| 5,684,658 | A | 11/1997 | Shi et al. |
| 5,696,654 | A | 12/1997 | Gill et al. |
| 5,721,008 | A | 2/1998 | Huang et al. |
| 5,796,535 | A | 8/1998 | Tuttle et al. |
| 5,831,888 | A | 11/1998 | Glover |
| 5,963,400 | A | 10/1999 | Cates et al. |
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,104,562 | A | 8/2000 | Ottesen et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,154,335 | A | 11/2000 | Smith et al. |
| 6,157,510 | A | 12/2000 | Schreck et al. |
| 6,175,893 | B1 | 1/2001 | D'Souza et al. |

(Continued)

*Primary Examiner* — Nabil Hindi

(57) ABSTRACT

A disk drive is disclosed comprising a disk comprising a track, wherein the track comprises a sync mark. The disk drive further comprises a head comprising a plurality of read sensors including a first read sensor, and a second read sensor separated from the first read sensor by a down-track spacing. A first time-stamp (TS1) is generated after detecting the sync mark using the first read sensor as the disk rotates, and a second time-stamp (TS2) is generated after detecting the sync mark using the second read sensor as the disk rotates. A calibration value representing the down-track spacing is generated based on the TS1 and the TS2.

18 Claims, 8 Drawing Sheets

(56) References Cited

U.S. PATENT DOCUMENTS

| | | |
|---|---|---|
| 6,178,056 B1 | 1/2001 | Cloke et al. |
| 6,191,909 B1 | 2/2001 | Cloke et al. |
| 6,191,925 B1 | 2/2001 | Watson |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,131 B2 | 9/2002 | Guo et al. |
| 6,449,767 B1 | 9/2002 | Krapf et al. |
| 6,453,115 B1 | 9/2002 | Boyle |
| 6,469,878 B1 | 10/2002 | Mack et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,496,333 B1 | 12/2002 | Han et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,674,618 B2 | 1/2004 | Engel et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,209 B2 * | 2/2004 | Hughes .............. G11B 15/4677 360/64 |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |

(56) References Cited

U.S. PATENT DOCUMENTS

| | | |
|---|---|---|
| 6,986,007 B1 | 1/2006 | Procyk et al. |
| 6,986,154 B1 | 1/2006 | Price et al. |
| 6,987,408 B2 | 1/2006 | Kim |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,709 B1 | 8/2007 | Krapf |
| 7,271,970 B2 | 9/2007 | Tsuchiya |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,436,632 B2 | 10/2008 | Li et al. |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |

(56) References Cited

U.S. PATENT DOCUMENTS

| | | |
|---|---|---|
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 | 12/2013 | Burd |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0250447 A1 | 9/2013 | Erden |

* cited by examiner

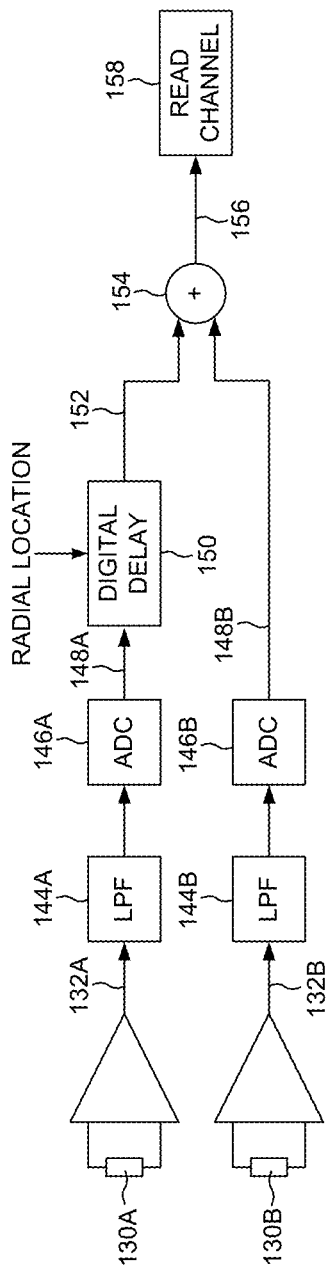
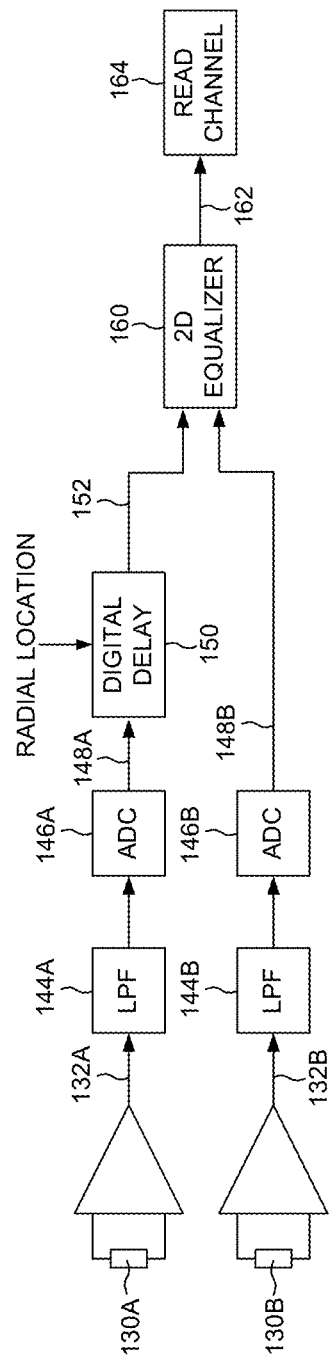

US 9,257,145 B1

DISK DRIVE MEASURING DOWN-TRACK SPACING OF READ SENSORS

CROSS-REFERENCE TO RELATED APPLICATIONS

This application claims priority to provisional U.S. Patent Application Ser. No. 61/909,913, filed on Nov. 27, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 9A shows an embodiment wherein first signal samples of a first read signal are combined with second signal samples of the second read signal by configuring a digital delay based on the measured down-track spacing.

FIG. 9B shows an embodiment wherein a two-dimensional equalization of the first signal samples and the second signal samples is executed prior to data detection within a read channel.

DETAILED DESCRIPTION

Figure 1:
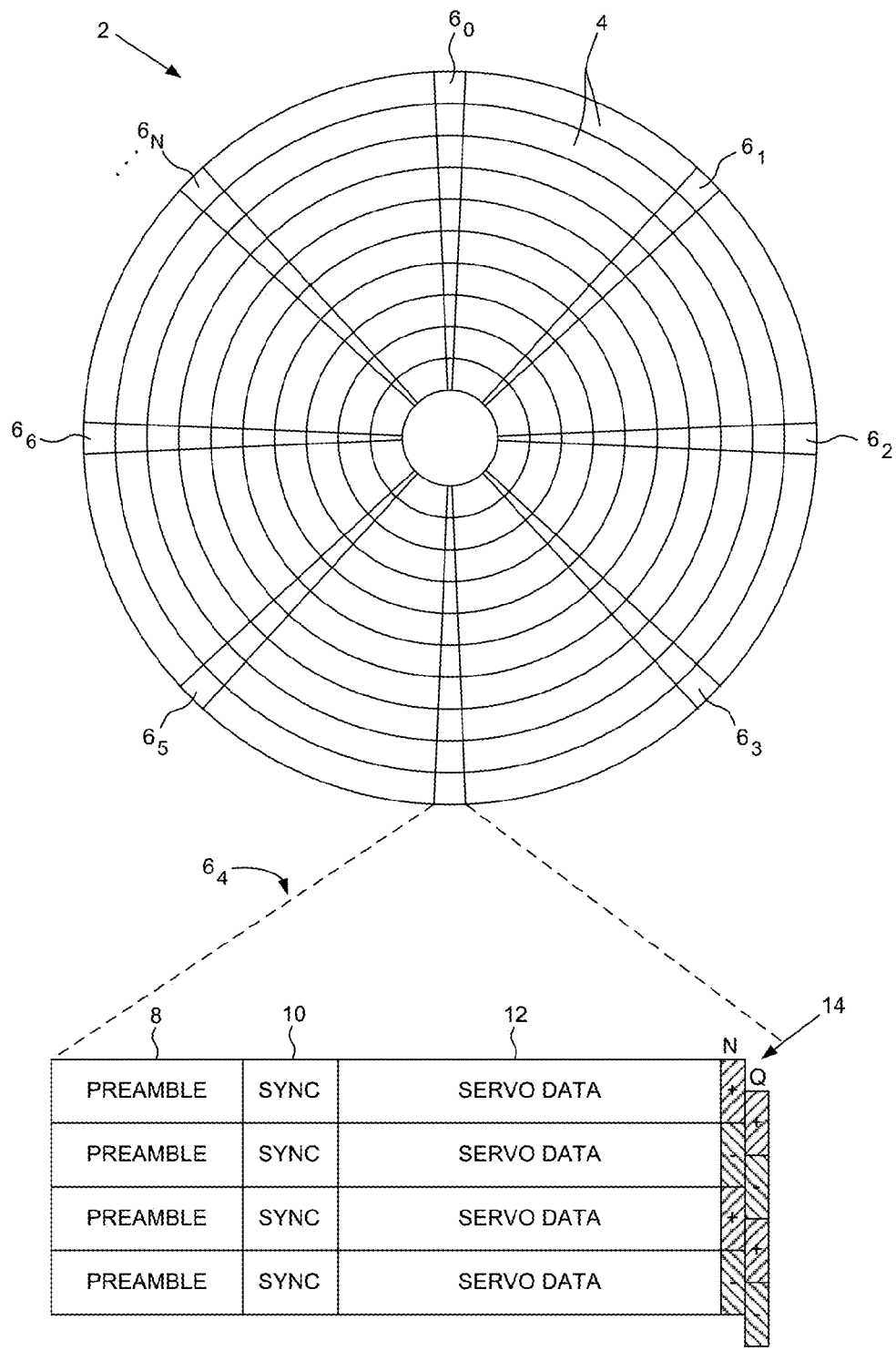
FIG. 1 shows a prior art disk format comprising a plurality of servo tracks defined by servo sectors.
Figure 2:
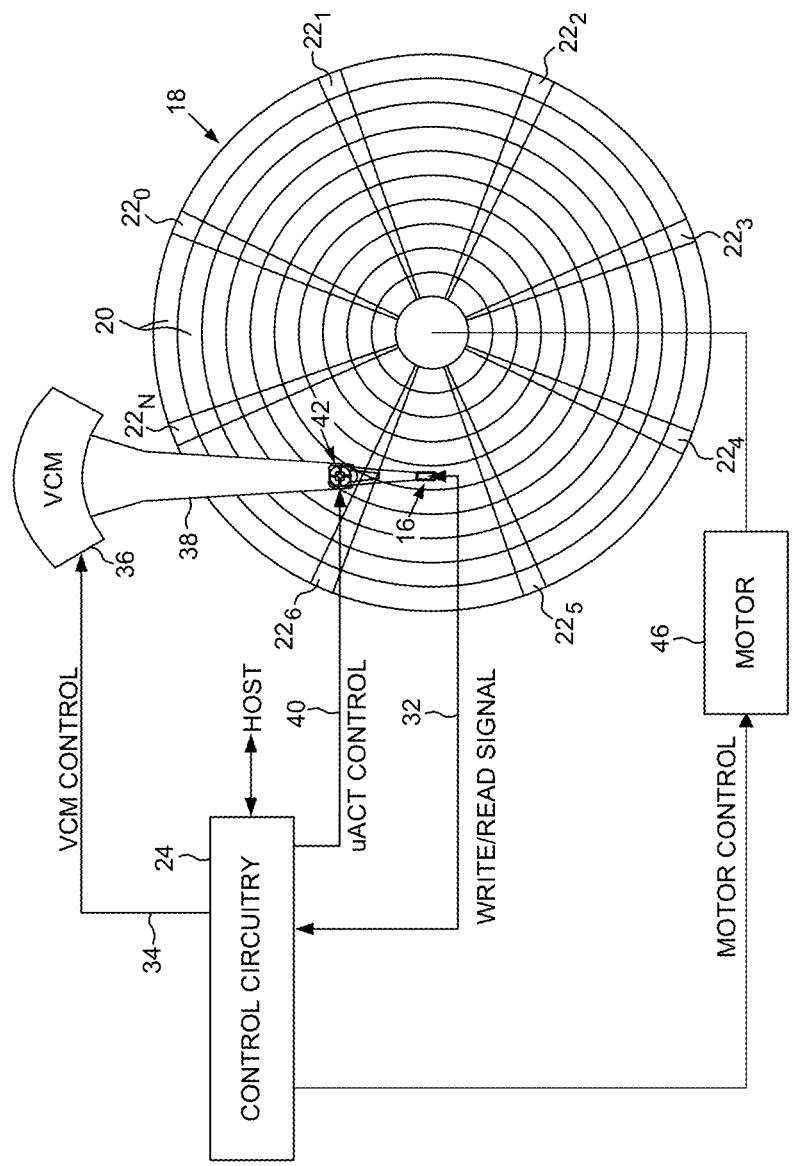
FIG. 2 shows a disk drive according to an embodiment comprising a head actuated over a disk.

FIG. 2 shows a hard disk drive (HDD) according to an embodiment comprising a head 16 and a disk 18 comprising a plurality of servo tracks 20, wherein each servo track comprises a plurality of servo sectors $22_0$-$22_N$. The disk drive further comprises control circuitry 24 comprising a servo control system operable to actuate the head over the disk in response to the servo sectors $22_0$-$22_N$. The disk is rotated by a spindle motor 46 at a rotational speed that is controlled by the control circuitry 24, for example, a motor driver of the control circuitry 24.

In the embodiment of FIG. 2, the control circuitry 24 processes a read signal 32 emanating from the head 16 to demodulate the servo sectors $22_0$-$22_N$ and generate a position error signal (PES) representing an error between the actual position of the head and a target position relative to a target track. In one embodiment, the target track comprises a target data track defined relative to the servo tracks 20, wherein the data tracks may be recorded at the same or different radial density than the servo tracks 20. The control circuitry 24 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The control circuitry 24 may also generate a control signal 40 applied to a microactuator 42 in order to actuate the head 16 over the disk 18 in fine movements. Any suitable microactuator 42 may be employed in the embodiments, such as a piezoelectric actuator. In addition, the microactuator 42 may actuate the head 16 over the disk 18 in any suitable manner, such as by actuating a suspension relative to the actuator arm, or actuating a slider relative to the suspension. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

To accomplish reading and writing of data to and from the disk, the control circuitry may include a read channel configured to process the read signal 32 from the head 16 and a write channel to prepare write signal 32 for sending to the head 16 for writing.

In one embodiment, the head 16 may comprise a two-dimensional magnetic recording (TDMR) head, in which there can be multiple reader elements (read sensors) within the TDMR head. In such a situation, there is an inherent down-track separation between the individual read sensors which can vary greatly over process, for each head. For any TDMR data or servo operation, the separation of the read sensors is preferably obtained for optimal digital signal processing (DSP) of the signals from the different read sensors. In some implementations it is preferable that this read sensor separation be measured with high precision at different radial locations on the disk (e.g., adjusting for different actuator positions). Some embodiments of the invention introduce methods to measure this down-track separation. In some embodiments, the measurements are performed after final assembly, after the drive is operational.

TDMR is a read-back optimized technology. The advent of multiple readers on the same slider gives the opportunity to extract multiple read signals and subsequently improved signal-to-noise (SNR) gains via signal processing the signal out of multiple read sensors (read sensors can read the same track or adjacent tracks). TDMR gains are expected when either reading mainly the same track or processing signal from a main track and its adjacent tracks.

Figure 3:
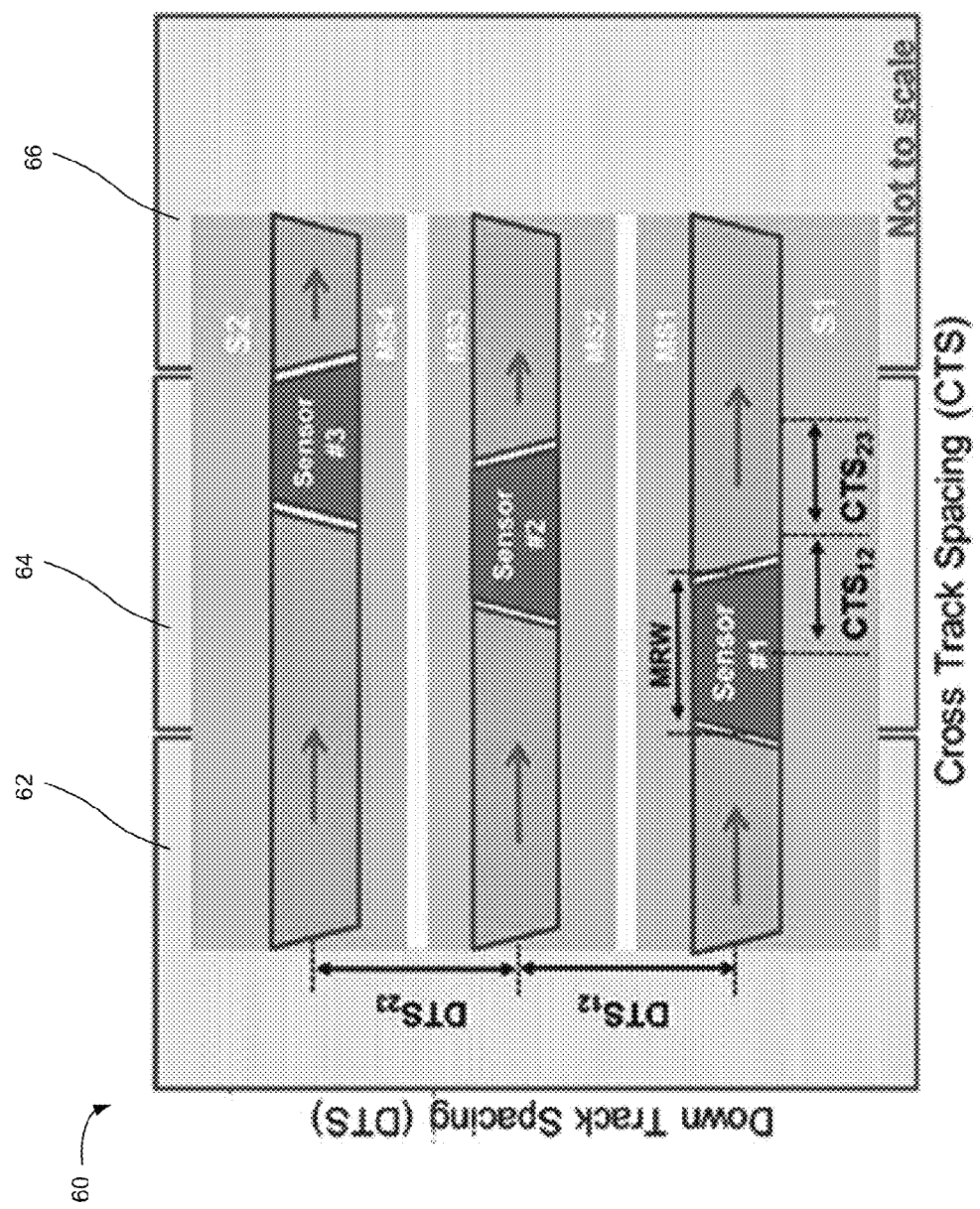
FIG. 3 shows an embodiment wherein the head comprises a plurality of read sensors separated by a down-track spacing.

FIG. 3 shows an example read sensor configuration 60 according to one embodiment. The read sensors within the head are labeled in the figure as Sensor #1, #2, and #3. The tracks on the disk are represented by the vertical rectangles 62, 64, and 66. The figure shows the down-track spacing (DTS) between the individual read sensors, as well as the cross-track spacing (CTS) between the sensors. Both the DTS and CTS may be significantly different for every head due to manufacturing variances. In addition, real-time operating conditions such as temperature, touchdown condition, and head skew angle can also contribute to variances at different times.

Having real-time measurements of DTS allows tracking of any perturbations (both thermal and mechanical) and enables optimal timing-alignment of the signals coming from multiple readers, which translates to better SNR and an improvement in servo-positioning. Thus, described below are various embodiments that use time-stamps from multiple read sensors to accurately measure DTS.

One embodiment leverages existing infrastructure within the read channel circuitry to enable the use of time-stamps to measure DTS. In some read channel implementations there may exist a free running counter running off of a main timebase. The counter may be reset by servo sync mark (SSM) detection. Once the time-stamp is enabled, for each of the subsequent SSM detections, the count is captured and stored. The capturing of the count when the SSM is detected is referred to as a "time-stamp." Knowing the number of counts between each SSM (the difference in counts) can represent the down-track spacing between the read sensors. Alternatively, for the purpose of generating DTS values, such a time-stamp mechanism can be implemented outside of the read channel circuitry as an independent component.

In one embodiment, the sync mark (SM) used can be either a spiral sync mark, a servo sync mark, or a read data sync mark. Indeed, the type of sync mark used can vary, as long as the sync marks on the disk are aligned and/or the skew is controlled. In one embodiment, the time-stamp is derived by a counter internal to the channel (or an independent time-stamping mechanism as described above) that provides sub-T resolution (e.g., T/4 to T/128), where T represents the data rate period of the sync mark bits. In one embodiment, time-stamps from different read sensors can be derived from one counter. In another embodiment, time-stamps from different read sensors can be derived from different counters that are properly synchronized. Either way, this ensures that the time-stamp difference translates to a precise measurement of spatial separation between the read sensors. The difference calculation of these counters (time-stamps) can be used to provide a continuous measurement called a "calibration value" representing the down-track spacing between read sensors.

In one embodiment, one of the read sensors is programmed as the "primary" sensor and the other is programmed as the secondary sensor. If the primary sensor detects the SM first, then the "calibration" value will be positive. If the secondary sensor detects the SM first, then the "calibration" value will be negative.

Figure 4:
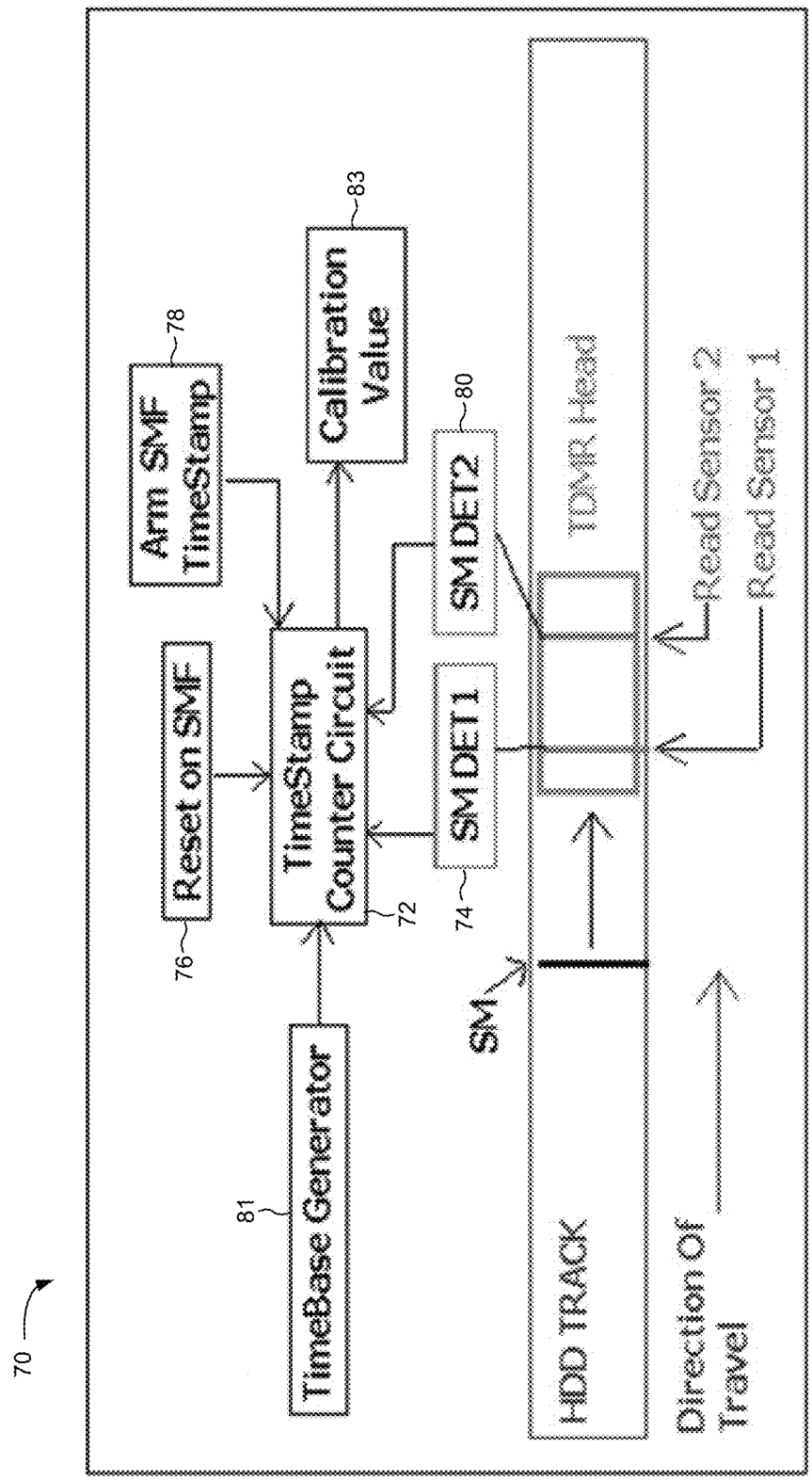
FIG. 4 shows control circuitry according to an embodiment for measuring a first temp-stamp (TS1) when a first read sensor passes over a sync mark, and measuring a second time stamp (TS2) when a second read sensor passes over the sync mark.

FIG. 4 depicts an example timing circuit implementation 70 in which calibration values are derived from time-stamps according to one embodiment. As described above, the timing circuit implementation 70 may include components that may already exist within a read channel implementation, or may be implemented separately as a mechanism independent from the read channel circuitry. In one embodiment, a "TimeStamp Counter Circuit" block 72 is reset when the sync mark (SM) is detected at block 74 in response to the Read Sensor 1 (e.g., by the "RESET on SMF" block 76 as shown). Next, the "TimeStamp Counter Circuit" block 72 is armed (e.g., by the "Arm SMF Time-stamp" block 78 as shown) to capture the time-stamp values as the sync mark (SM) is detected by the following read sensors (e.g., detected at block 80 in response to Read Sensor 2). In one embodiment, a "TimeBase Generator" block 81 provides a base timing clock, which is supplied to the "TimeStamp Counter Circuit" block 72. Once the time-stamps have been generated, "Calibration Value" block 83 processes the time-stamps to generate a calibration value representing the down-track spacing between the read sensors, for example, based on a difference between the time-stamps.

As the track moves under the head, the SM may pass under the first "leading" sensor and the channel may detect the SM with detector one ("SM DET 1" block 74 in the figure). This may cause the circuit to capture the first time-stamp value and store. This same sync mark may then pass under the second "trailing" sensor and the channel may detect the SM with detector two ("SM DET 2" block 80 in the figure), which may cause the circuit to capture the second time-stamp value and store. As shown in the figure, the time-stamp counter circuit can be used to determine the difference of the two time-stamp values and output a difference. As shown, the difference may be calculated and used (e.g., by the read channel or some other external logic) to determine a calibration value. Such a calibration value can be used on-the-fly by the channel for timing-alignment. In one embodiment, it may be stored in a register for firmware access which can be used by an external DSP or other operations to improve SNR. The calibration value can be used to align the signals inside the read channel or by external DSP circuitry or software.

Figure 5:
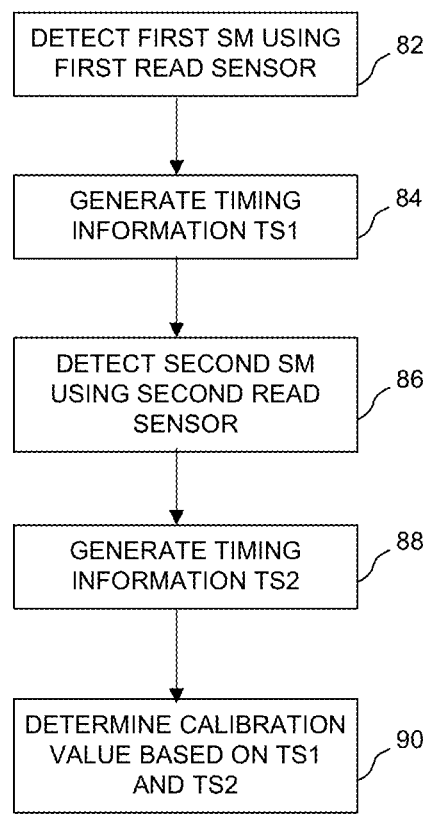
FIG. 5 is a flow diagram according to an embodiment wherein a calibration value representing the down-track spacing between the first and second read sensors is generated based on the TS1 and the TS2.

FIG. 5 shows a conceptual flowchart of a calibration value generation process according to an embodiment. In block 82, a first SM is detected using the first read sensor of a TDMR head. In block 84, timing information TS1 is generated. In block 86, a second SM is detected using the second read sensor of the TDMR head. In block 88, timing information TS2 is generated. In block 90, a calibration value is determined based at least in part on the generated timing information TS1 and TS2. In one embodiment, the process may be implemented in and/or executed by the control circuitry 24 of FIG. 2. In one embodiment, the process may be implemented in and/or executed by the read channel circuitry of FIG. 4. Those skilled in the art will appreciate that the process can be extended to generate calibration values for more than one pair of TDMR read sensors. In other embodiments, three or more time-stamps may be used to generate calibration value(s) for three read sensors as shown in the example of FIG. 3.

Figure 6A:
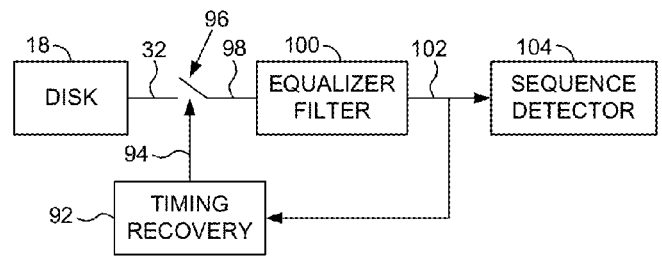
FIGS. 6A and 6B show an embodiment wherein existing infrastructure of a timing recovery circuit is leveraged to generate the time-stamps TS1 and TS2.

FIG. 6A shows control circuitry according to an embodiment comprising a timing recovery circuit 92 operable to generate a sampling clock 94 applied to a signal sampler 96 which samples the read signal 32 to generate signal samples 98. An equalizer filter 100 filters the signal samples 98 according to a desired response (e.g., a partial response), and the equalized signal samples 102 are processed by a sequence detector 104 to detect data recorded on the disk 18. In one embodiment, the timing recovery circuit 92 generates the sampling clock 94 synchronous with the data rate of the recorded data so that the signal samples 98 are substantially synchronous with the data rate.

Figure 6B:
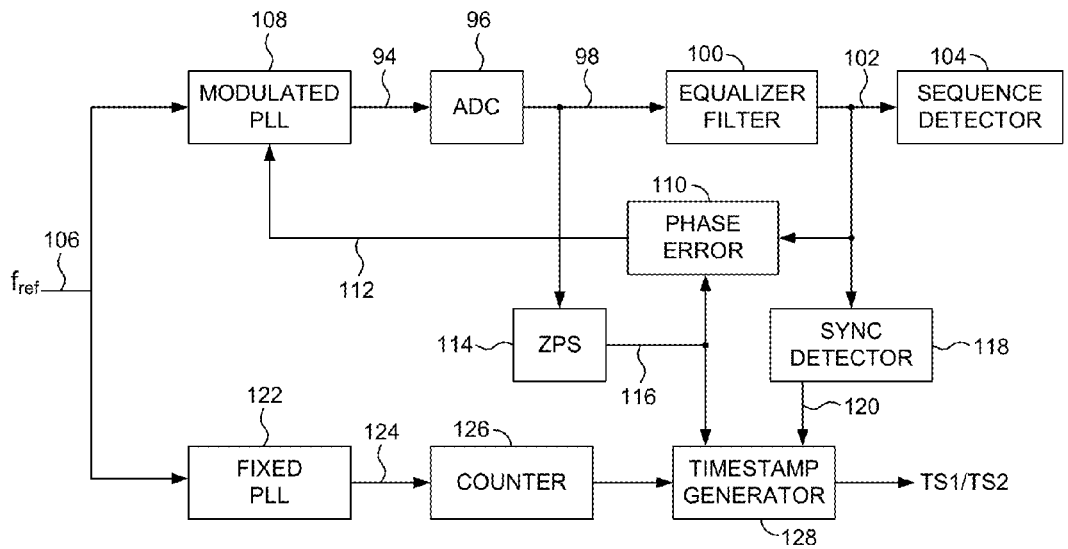

Any suitable timing recovery circuit 92 may be employed to generate the synchronous signal samples, and in one embodiment the timing recovery circuit 92 may be leveraged to generate the timestamps for measuring the down-track spacing of the read sensors. FIG. 6B shows an embodiment of a timing recovery circuit wherein a reference clock 106 (e.g., generated by a resonator, oscillator, crystal, etc.) is processed by a first phase-locked loop (PLL) 108 to generate the sampling clock 94 applied to the signal sampler 96 (analog-to-digital converter). A phase error detector 110 processes the equalized signal samples 102 to measure a phase error 112 that adjusts the first PLL 108 so as to synchronize the sampling clock 94 to the data rate. A zero-phase start (ZPS) block 114 processes the signal samples 98 (e.g., of a preamble) to generate a zero-phase start value 116 representing an initial phase error of the signal samples which is used to initialize the phase error detector 110. That is, the zero-phase start value 116 represents an initial fraction of the sampling clock 94 cycling substantially at the data rate of period T. A sync mark detector 118 processes the equalized signal samples 102 and generates a sync mark detected signal 120 at the resolution of the sampling clock 94. The reference clock 106 is processed by a second PLL 122 which generates a fixed frequency clock 124 (substantially at the data rate) used to clock a counter 126. A timestamp generator 128 combines the output of the counter 126 when the sync mark is detected (which represents an integer value for the timestamp) with the zero-phase start value 114 (which represents a fractional value for the timestamp) to generate a high resolution timestamp. This embodiment enables a very accurate, sub-T measurement of the down-track spacing between the read sensors by leveraging existing infrastructure of the timing recovery circuit 92.

In one embodiment, the down-track spacing of the read sensors may vary based on the radial location of the head 16 due to the skew angle of the head 16 as well as the varying linear velocity of the tracks. For example, in one embodiment the linear velocity of the tracks (and sync mark within a track) increases toward the outer diameter of the disk due to the increasing circumference of the tracks, and therefore the down-track spacing as measured relative to a reference clock will decrease since it will take fewer clock cycles for the sync mark to travers the physical gap between the read sensors. Accordingly, in one embodiment illustrated in FIG. 7 the down-track spacing for at least two of the read elements may be measured at a plurality of different radial locations (represented by black dots), and these data points curve fitted to a suitable function, such as a suitable polynomial. The down-track spacing may then be estimated for any radial location of the head based on this curve-fitted function.

Figure 7:
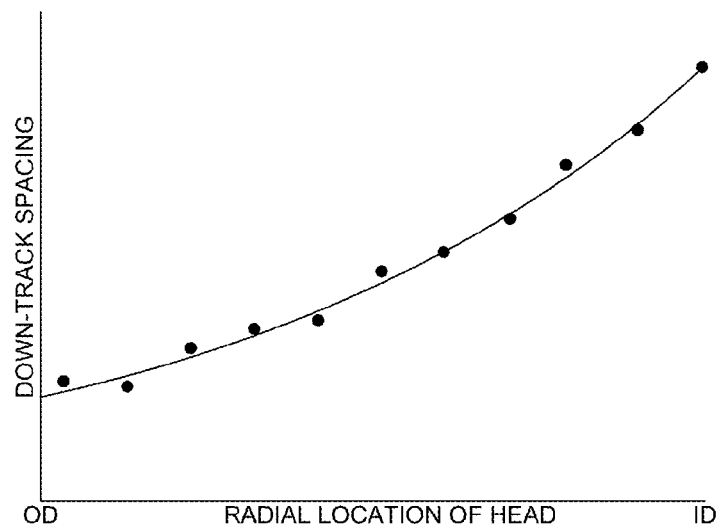
FIG. 7 shows an embodiment wherein the down-track spacing (measured in time) between read sensors is measured at different radial locations across the disk.
Figure 8:
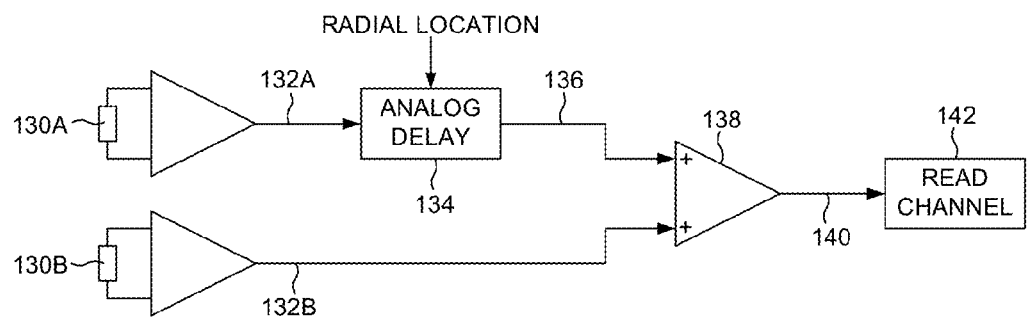
FIG. 8 shows an embodiment wherein an analog delay is configured based on the measured down-track spacing so as to align first and second analog read signals generated by first and second read sensors.

As described above, in one embodiment the calibration value representing the down-track spacing between the read sensors may be used to combine the read signals from the respective heads in either the analog or digital domain in order to improve the performance of the read channel. FIG. 8 shows an embodiment wherein a first read sensor 130A generates a first read signal 132A and a second read sensor 130B generates a second read signal 132B. The first read signal 132A is delayed using an analog delay circuit 134 to generate a delayed read signal 136 that is added to the second read signal 132B at analog adder 138. The analog delay circuit 134 is configured with an adjustable delay corresponding to the down-track spacing of the first and second read sensors 130A and 130B so that the first and second read signals 132A and 132B are aligned in time, and in one embodiment the analog delay is adjusted based on the radial location of the head to account for the varying down-track spacing as shown in FIG. 7. The resulting combined read signal 140 is then processed by read channel 142 to detect data recorded on the disk 18.

In another embodiment, the first and second read signals 132A and 132B may be combined in the digital domain. FIG. 9A shows an example of this embodiment wherein the first read signal 132A is low pass filtered 144A and sampled 146A to generate first signal samples 148A, and the second read signal 132B is low pass filtered 144B and sampled 146B to generate second signal sample 148B. The first signal samples 148A are delayed using digital delay circuitry 150 for delaying the first read signal 132A in discrete time. The delayed signal samples 152 are combined at digital adder 154 with the second signal samples 148B to generate combined signal samples 156 that are processed by read channel 158. Any suitable digital delay circuit 150 may be employed to generate an integer and fractional sample period delay representing the down-track spacing of the read sensors. In one embodiment, the integer delay may be implemented with a shift register and the fractional delay implemented using a phase-offset sampling clock for clocking the sampling device 146B relative to sampling device 146A, or an interpolating filter for phase shifting the first signal samples 148A. In one embodiment the digital delay is adjusted based on the radial location of the head to account for the varying down-track spacing as shown in FIG. 7. The resulting combined signal samples 156 are then processed by read channel 158 to detect data recorded on the disk 18.

FIG. 9B shows an alternative embodiment wherein the delayed signal samples 152 and the second signal samples 148B are processed by a two-dimensional (2D) equalizer 160. In one embodiment, the 2D equalizer 160 outputs two sequences 162 of signal samples that are processed by a 2D read channel 164 (e.g., using a 2D Viterbi detector). In another embodiment, the 2D equalizer 160 outputs a sequence of signal samples 162 with inter-track interference (ITI) attenuated so that the sequence of signal samples 162 may be processed with a one-dimensional (1D) read channel 164 (e.g., using a 1D Viterbi detector).

Some embodiments of the invention thus provide an accurate on-the-fly methodology to track inter-reader down-track separation, enabling SNR gain for data detection (e.g., due to precise timing-alignment of signals feeding 2D equalizer as described above) and improving servo-positioning. Along with this is the possibility of reducing the size of the servo-format by reducing burst length and hence gaining SNR. The logic can also enable/simplify specific applications and test-process. A good example would be measuring coherence of the write process (i.e. speed-up process time during servo-filler). In other embodiments, the down-track spacing measurements may be used to characterize and/or validate the manufacturing tolerances and fabrication process of the read sensors.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry or DSP comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a track, wherein the track comprises a sync mark;
   a head comprising a plurality of read sensors including a first read sensor, and a second read sensor separated from the first read sensor by a down-track spacing; and
   control circuitry configured to:
      generate a first time-stamp (TS1) after detecting the sync mark using the first read sensor as the disk rotates;
      generate a second time-stamp (TS2) after detecting the sync mark using the second read sensor as the disk rotates; and
      generate a calibration value representing the down-track spacing based on the TS1 and the TS2.

2. The disk drive as recited in claim 1, wherein the control circuitry is further configured to generate the calibration value based on a difference between the TS1 and the TS2.

3. The disk drive as recited in claim 1, wherein the control circuitry is further configured to:
   sample a read signal generated by the first read sensor based on a reference clock to generate signal samples;
   detect the sync mark based on the signal samples; and
   generate the TS1 based on the reference clock.

4. The disk drive as recited in claim 3, wherein the control circuitry is further configured to:
   detect a zero-phase start value based on the signal samples;
   detect the sync mark based on the zero-phase start value;
   clock a counter based on the reference clock;
   generate an integer part of the TS1 based on the counter when the sync mark is detected; and
   generate a fractional part of the TS1 based on the zero-phase start value.

5. The disk drive as recited in claim 1, wherein the control circuitry is further configured to measure the down-track offset at a plurality of different radial locations across the disk.

6. The disk drive as recited in claim 1, wherein the control circuitry is further configured to combine a first read signal generated by the first read sensor with a second read signal generated by the second read sensor based on the measured down-track spacing.

7. The disk drive as recited in claim 6, wherein the control circuitry is further configured to combine samples of the first read signal with samples of the second read signal based on the measured down-track spacing.

8. The disk drive as recited in claim 1, wherein the control circuitry is further configured to:
   sample a first read signal generated by the first read sensor to generate first signal samples;
   sample a second read signal generated by the second read sensor to generate second signal samples; and
   execute a two-dimensional equalization of the first signal samples and the second signal samples.

9. The disk drive as recited in claim 8, wherein the control circuitry is further configured to execute the two-dimensional equalization in order to reduce inter-track interference (ITI) in one dimension.

10. A method of operating a disk drive, the method comprising:
    generating a first time-stamp (TS1) after detecting a sync mark on a disk using a first read sensor as the disk rotates;
    generating a second time-stamp (TS2) after detecting the sync mark using a second read sensor as the disk rotates; and
    generating a calibration value representing a down-track spacing between the first read sensor and the second read sensor based on the TS1 and the TS2.

11. The method as recited in claim 10, further comprising generating the calibration value based on a difference between the TS1 and the TS2.

12. The method as recited in claim 10, further comprising:
    sampling a read signal generated by the first read sensor based on a reference clock to generate signal samples;
    detecting the sync mark based on the signal samples; and
    generating the TS1 based on the reference clock.

13. The method as recited in claim 12, further comprising:
    detecting a zero-phase start value based on the signal samples;

detecting the sync mark based on the zero-phase start value;

clocking a counter based on the reference clock;

generating an integer part of the TS1 based on the counter when the sync mark is detected; and generating a fractional part of the TS1 based on the zero-phase start value.

14. The method as recited in claim 10, further comprising measuring the down-track offset at a plurality of different radial locations across the disk.

15. The method as recited in claim 10, further comprising combining a first read signal generated by the first read sensor with a second read signal generated by the second read sensor based on the measured down-track spacing.

16. The method as recited in claim 15, further comprising combining samples of the first read signal with samples of the second read signal based on the measured down-track spacing.

17. The method as recited in claim 10, further comprising:

sampling a first read signal generated by the first read sensor to generate first signal samples;

sampling a second read signal generated by the second read sensor to generate second signal samples; and executing a two-dimensional equalization of the first signal samples and the second signal samples.

18. The method as recited in claim 17, further comprising executing the two-dimensional equalization in order to reduce inter-track interference (ITI) in one dimension.

* * * * *